United States Patent
Ravella et al.

(10) Patent No.: US 12,097,867 B2
(45) Date of Patent: Sep. 24, 2024

(54) METHODS AND APPARATUS FOR COMPENSATING FOR UNIQUE TRAILER OF TRACTOR TRAILER WITH AUTONOMOUS VEHICLE SYSTEM

(71) Applicant: PlusAI, Inc., Santa Clara, CA (US)

(72) Inventors: Siva Bhargav Ravella, Santa Clara, CA (US); Xiaoyu Huang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/131,153

(22) Filed: Apr. 5, 2023

(65) Prior Publication Data

US 2023/0311906 A1     Oct. 5, 2023

Related U.S. Application Data

(63) Continuation of application No. 17/708,805, filed on Mar. 30, 2022, now Pat. No. 11,634,147.

(51) Int. Cl.
 *B60W 50/02* (2012.01)
 *B60C 23/04* (2006.01)
 (Continued)

(52) U.S. Cl.
 CPC ..... *B60W 50/0205* (2013.01); *B60C 23/0484* (2013.01); *B60W 10/18* (2013.01);
 (Continued)

(58) Field of Classification Search
 CPC .. B60W 50/0205; B60W 10/18; B60W 10/20; B60W 50/0225; B60W 50/14;
 (Continued)

(56) References Cited

U.S. PATENT DOCUMENTS 5,739,592 A * 4/1998 Rigsby ............... B60D 1/62
                                                  701/32.7
5,780,732 A   7/1998 Gieseler et al.
(Continued)

FOREIGN PATENT DOCUMENTS

JP      2006011981 A  *  1/2006
WO      2014060296 A1      4/2014

*Primary Examiner* — Daniel M. Robert
(74) *Attorney, Agent, or Firm* — Sheppard Mullin Richter & Hampton LLP (57) ABSTRACT

A method includes an initial trailer health assessment and real-time trailer health monitoring. The initial trailer health assessment includes autonomous pre-trip maneuvers of the autonomous vehicle during a first time period, and detecting a pre-trip vehicle health condition. A vehicle health score is calculated based on the pre-trip vehicle health condition. If the vehicle health score is at least a threshold value, real-time trailer health monitoring is performed during a trip of the autonomous vehicle during a second time period, by actively monitoring vehicle dynamics data and/or image data associated with the autonomous vehicle, to determine a fault condition of the autonomous vehicle. If the fault condition meets a first criteria, a control parameter and/or a travel plan of the autonomous vehicle is adjusted. If the fault
(Continued)

condition meets a second criteria different from the first criteria, a signal is sent to cause the autonomous vehicle to cease movement.

20 Claims, 7 Drawing Sheets

(51) Int. Cl.
    *B60W 10/18*     (2012.01)
    *B60W 10/20*     (2006.01)
    *B60W 50/038*     (2012.01)
    *B60W 50/14*     (2020.01)
    *B60W 60/00*     (2020.01)

(52) U.S. Cl.
    CPC ........ *B60W 10/20* (2013.01); *B60W 50/0225* (2013.01); *B60W 50/14* (2013.01); *B60W 60/0011* (2020.02); *B60W 50/038* (2013.01); *B60W 2050/146* (2013.01); *B60W 2300/147* (2024.01); *B60W 2420/403* (2013.01); *B60W 2420/408* (2024.01); *B60W 2510/182* (2013.01); *B60W 2520/00* (2013.01)

(58) Field of Classification Search
    CPC ........... B60W 60/0011; B60W 50/038; B60W 2050/146; B60W 2300/126; B60W 2420/42; B60W 2420/52; B60W 2510/182; B60W 2520/00; B60W 2050/0292; B60W 30/146; B60W 50/029; B60W 60/00186; B60W 2050/021; B60W 2300/14; B60W 2510/18; B60W 2530/10; B60W 2530/20; B60W 2556/10; B60C 23/0484
See application file for complete search history.

(56) References Cited

U.S. PATENT DOCUMENTS

| | | | |
|---|---|---|---|
| 2003/0033072 A1* | 2/2003 | Nantz | B60T 8/172 |
| | | | 123/352 |
| 2004/0172954 A1 | 9/2004 | Hanson et al. | |
| 2007/0005202 A1 | 1/2007 | Breed | |
| 2007/0044551 A1 | 3/2007 | Fogelstrom | |
| 2007/0114756 A1 | 5/2007 | Shagbazyan | |
| 2007/0255475 A1* | 11/2007 | Dagh | B60T 8/885 |
| | | | 303/148 |
| 2014/0157809 A1 | 6/2014 | Crombie et al. | |
| 2017/0287320 A1* | 10/2017 | Meade | G08C 17/02 |
| 2018/0052463 A1* | 2/2018 | Mays | B60T 7/22 |
| 2018/0099712 A1* | 4/2018 | Bean | G08B 13/126 |
| 2019/0084537 A1* | 3/2019 | Kasper | B60T 8/17551 |
| 2020/0070596 A1* | 3/2020 | Muhlhoff | B60C 23/04 |
| 2020/0247423 A1 | 8/2020 | Almahmoud et al. | |
| 2021/0181737 A1* | 6/2021 | Patnaik | G05D 1/0055 |
| 2021/0261131 A1* | 8/2021 | Simmons | B60W 10/04 |
| 2022/0114560 A1* | 4/2022 | Senzer | G07C 5/085 |
| 2022/0198842 A1 | 6/2022 | Agarwal et al. | |
| 2022/0266905 A1* | 8/2022 | Krone | B62D 15/021 |
| 2022/0324525 A1* | 10/2022 | Vikström | B62D 53/0864 |
| 2023/0123587 A1* | 4/2023 | Jatt | B67D 7/0401 |
| | | | 701/23 |
| 2023/0139933 A1* | 5/2023 | Tam | G06Q 10/20 |
| | | | 701/26 |
| 2023/0294634 A1* | 9/2023 | Tam | B60R 25/01 |
| 2023/0311906 A1* | 10/2023 | Ravella | B60W 30/146 |
| | | | 701/26 |

* cited by examiner

METHODS AND APPARATUS FOR COMPENSATING FOR UNIQUE TRAILER OF TRACTOR TRAILER WITH AUTONOMOUS VEHICLE SYSTEM

CROSS-REFERENCE TO RELATED APPLICATIONS

This application is a continuation of U.S. patent application Ser. No. 17/708,805, filed on Mar. 30, 2022 and entitled "METHODS AND APPARATUS FOR COMPENSATING FOR UNIQUE TRAILER OF TRACTOR TRAILER WITH AUTONOMOUS VEHICLE SYSTEM", which is incorporated in its entirety herein by reference.

FIELD

The present disclosure relates to autonomous vehicle health monitoring, and more specifically, to dynamic adjustments to operational parameters of an autonomous tractor trailer.

BACKGROUND

Tractors (also referred to as tractor units, tractor cabs or rigs) are heavy-duty towing vehicles that are often designed to be hitched to trailers of multiple different types, sizes and weights.

SUMMARY

In some embodiments, a method includes performing an initial trailer health assessment and real-time trailer health monitoring. The initial trailer health assessment includes autonomously causing, via a processor of an autonomous vehicle and during a first time period, a plurality of pre-trip maneuvers of the autonomous vehicle, and detecting, via the processor of the autonomous vehicle, a pre-trip vehicle health condition during the plurality of pre-trip maneuvers of the autonomous vehicle. A vehicle health score can be calculated based on the pre-trip vehicle health condition. In response to the vehicle health score being at least a threshold value, the real-time trailer health monitoring can be performed. The real-time trailer health monitoring includes, during a trip of the autonomous vehicle during a second time period after the first time period, actively monitoring at least one of vehicle dynamics data or image data associated with the autonomous vehicle, to determine a fault condition of the autonomous vehicle. In response to the fault condition of the autonomous vehicle meeting a first criteria (e.g., as defined in a lookup table), at least one of a control parameter of the autonomous vehicle or a travel plan of the autonomous vehicle may be adjusted. Alternatively or in addition, in response to the fault condition of the autonomous vehicle meeting a second criteria different from the first criteria, a signal may be sent to cause the autonomous vehicle to cease movement.

In some embodiments, a method includes detecting, via a processor of an autonomous vehicle, a pre-trip vehicle health condition based on at least on autonomous pre-trip maneuver of the autonomous vehicle. The method also includes actively monitoring, via a processor of an autonomous vehicle and during a trip of the autonomous vehicle, at least one of vehicle dynamics data or image data associated with the autonomous vehicle, to detect a fault condition of the autonomous vehicle. The fault condition of the autonomous vehicle can include one or more of: wheel misalignment, brake wear, brake fade, or tire underinflation. The method also includes at least one of: (1) in response to the fault condition of the autonomous vehicle meeting a first criteria, adjusting at least one of a control parameter of the autonomous vehicle or a travel plan of the autonomous vehicle; or (2) in response to the fault condition of the autonomous vehicle meeting a second criteria different from the first criteria, causing the autonomous vehicle to cease movement.

In some embodiments, a non-transitory, processor-readable medium stores processor-executable instructions that, when executed by a processor, cause the processor to autonomously cause, via the autonomous vehicle, a sequence of pre-trip maneuvers of the autonomous vehicle to be performed during a first time period. The processor-readable medium also stores processor-executable instructions to cause the processor to detect, via the autonomous vehicle, at least one pre-trip vehicle health condition during and/or in response to the sequence of pre-trip maneuvers of the autonomous vehicle, and to calculate, via the autonomous vehicle, a vehicle health score based on the at least one pre-trip vehicle health condition. The processor-readable medium also stores processor-executable instructions to cause the processor to permit operation of the autonomous vehicle during a second time period after the first time period, in response to the vehicle health score being at least a threshold value.

DETAILED DESCRIPTION

Over time and with increased use, trailers of semi-trucks can develop anomalies such as poor wheel alignment, brake wear, unintended underinflated tire(s), etc. These anomalies, or "faults," may not be severe enough to attract immediate attention and maintenance effort. Such anomalies, however, can significantly affect control performance and fuel efficiency during runtime (i.e., when a semi-truck is operating).

Systems and methods of the present disclosure, according to some embodiments, facilitate the automatic implementation of pre-trip trailer health assessments and mid-trip (i.e., during a trip) trailer health monitoring for autonomous vehicles (e.g., autonomous semi-trucks). Pre-trip trailer health assessments of the present disclosure can include one or more predefined maneuvers to be performed by a given autonomous vehicle prior to a trip, and initial assessments of the "health" (i.e., fitness for use) of the autonomous vehicle can be made based on the performance of the autonomous vehicle when performing the predefined maneuvers. If the initial health assessment results in a health score of the autonomous vehicle that is above a predefined threshold, the autonomous vehicle can proceed to execute a trip. The trailer health monitoring performed during the trip can include detecting anomalies based on vehicle dynamics data and/or image data (e.g., camera data, light detection and ranging (lidar) data), and compensatory commands may be automatically issued to compensate for any detected anomalies, for example to ensure/maintain sufficient driving performance and/or to increase fuel efficiency. The trailer health monitoring can be performed continuously throughout a trip, or successively performed within discontinuous time windows (e.g., according to a predefined schedule) and/or in response to one or more conditions detected at the autonomous vehicle.

In some embodiments, an initial health assessment is performed for an autonomous semi-truck (including a trailer) prior to the initiation of a trip, or during an initial time period of a trip, by automatically implementing, at the autonomous semi-truck, a pre-defined set of maneuvers. The pre-defined set of maneuvers can be selected to assess one or more trailer characteristics, such as brake system hysteresis, brake pressure offset, loading conditions, wheel balance, etc.

When the initial health assessment is performed during the initial time period of the trip, each maneuver from the pre-defined set of maneuvers may or may not interfere with a "normal" routing of the autonomous semi-truck. In other words, some of the maneuvers can be performed without the autonomous semi-truck deviating from a predefined route. Examples of such maneuvers can include brake cycling while the autonomous semi-truck is at standstill, and slowly increasing ("ramping up") brake pressure while driving. By contrast, others of maneuvers can involve the autonomous semi-truck deviating from the predefined route. Examples of such maneuvers can include low-speed large-radius turns (e.g., in a parking lot), to facilitate better image capture.

As used herein, "pre-trip" can refer to actions taking place prior to a planned/predefined trip of the autonomous vehicle, including actions taking place immediately prior to the planned trip (e.g., within the immediately preceding minutes or hours), actions taking place within one day prior to the planned trip, actions taking place within one week prior to the planned trip, etc. In some embodiments, pre-trip does not refer to actions taking place more than one day prior to a planned trip. In other embodiments, pre-trip does not refer to actions taking place more than one week prior to a planned trip. In still other embodiments, pre-trip does not refer to actions taking place more than two weeks prior to a planned trip. In still other embodiments, pre-trip does not refer to actions taking place more than one month prior to a planned trip.

As used herein, a "maneuver" refers to a movement, a sequence of movements, an action, or a sequence of actions performed either automatically by an autonomous vehicle (e.g., software-implemented commands) or by a driver/user of the autonomous vehicle. Maneuvers can include, by way of non-limiting example, any combination of: turning the autonomous vehicle along a predefined trajectory or path while the autonomous vehicle is in motion, applying uniform pressure to the brakes once or multiple times (e.g., according to a predefined pattern), applying gradually increasing pressure to the brakes once or multiple times (e.g., according to a predefined pressure gradient), applying pressure to the accelerator while the autonomous vehicle is parked/not moving, and applying gradually increasing pressure to the accelerator while the autonomous vehicle is moving (and, optionally, when in a predefined gear).

In some embodiments, a pre-trip vehicle health condition is detected based on a plurality of pre-trip maneuvers of an autonomous vehicle, and an initial vehicle health score is calculated based on the pre-trip vehicle health condition. In some such implementations, if the initial vehicle health score is below a predefined threshold, and in response to the initial vehicle health score being below the predefined threshold, an alert may be generated and transmitted from the autonomous vehicle to a remote compute device and/or displayed via a user interface of the autonomous vehicle. Alternatively or in addition, if the initial vehicle health score is below a predefined threshold, and in response to the initial vehicle health score being below the predefined threshold, a report may be generated and transmitted from the autonomous vehicle to the remote compute device and/or displayed via the user interface of the autonomous vehicle. The report can include, for example, the initial vehicle health score, a representation of the pre-trip vehicle health condition, and/or results associated with the autonomous vehicle performing the pre-defined set of maneuvers. Alternatively or in addition, if the initial vehicle health score is below a predefined threshold, and in response to the initial vehicle health score being below the predefined threshold, the trip may be "aborted" (e.g., by automatically disabling the autonomous vehicle).

In some embodiments, an adaptive control system operates during runtime and includes three operating levels:

1) Fault-Tolerant Level: A fault-tolerant control mechanism that can be robust to a first range of deviations (e.g., a range of "low" deviation values) of the autonomous vehicle (e.g., of the trailer response), such that no action is taken in response to those deviations;

2) Adaptive Monitoring and Control Level: Adaptive adjustments are made to planning and control algorithms in response to detecting a deviation within a second range of deviations (e.g., a range of "high" deviation values) of the autonomous vehicle (e.g., of the trailer response), the deviations within the second range of deviations being of a higher significance or severity than the deviations within the first range of deviations. For example, once an underinflated tire(s) is detected, level 2 is triggered, and software automatically lowers an upper speed limit of the autonomous vehicle for safety and fuel efficiency;

3) Failsafe Level: A fallback mechanism to stop the truck.

In some embodiments, conditions or deviations of the autonomous vehicle (i.e., detected "symptoms") can be associated with one or more subsystems of the autonomous vehicle, and decisions for the detected symptoms may be predefined according to the detection phase in which they are identified, as shown in Table 1:

TABLE 1

Actions to be taken based on affected subsystem and detection phase

| Sub-System | Symptom | Detection Phase | Potential Root Cause | Action |
| --- | --- | --- | --- | --- |
| Brake | Insufficient deceleration | Initial health assessment | Brake wear | Abort trip and report anomaly |
| Brake | Significantly insufficient braking (e.g., loss in brake pressure) that also degrades over time | Runtime health monitoring | Brake fade; Mechatronic issue(s) | Execute safe truncated alternative route and abort trip |
| Tire | Larger resistance and/or smaller effective radius than usual | Initial health assessment or runtime health monitoring | Underinflated, slow leakage | Alert if in initial assessment; adjust planning/control if in runtime |
| Steering | Steering error (below a threshold value) | Initial health assessment or runtime health monitoring | Wheel alignment | Alert/report |
| Steering | Steering error (above a threshold value); Steering lag | Initial health assessment or runtime health monitoring | Sensor fault | Abort trip and report anomaly |

As used herein, a "semi-truck" refers to the combination of a tractor (also referred to as a tractor cab or rig) and one or more semi-trailers (e.g., for carrying freight). The tractor may be coupled to the one or more semi-trailers via one or more hitch connections, which provide mechanical, pneumatic and/or electrical coupling between the tractor and the one or more semi-trailers. Semi-trucks are also referred to as tractor-trailers, tractor-trailer trucks, semi-tractor-trailers, semi-trailer trucks, semi-tractor trucks, and semi-tractor-trailer trucks.

As used herein, an "autonomous vehicle" refers to any vehicle (e.g., a ground vehicle such as a car, truck, semi-truck, etc.) having vehicular automation, in that the vehicle is capable of sensing its environment and safely travelling (e.g., along a road) without human input, or with minimal human input. Autonomous vehicles described herein can be configured to wirelessly communicate with one or more remote compute devices, during periods of time when wireless connectivity is available/possible, for a variety of purposes including, but not limited to: receiving third-party data such as weather reports and alerts, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensos to detect road moisture, wind and temperature data associated with one or more locations along a route of travel, earthquake detection instruments (e.g., seismometers), etc.), transmitting sensor data generated at the autonomous vehicle, transmitting alerts, etc.

Figure 1A:
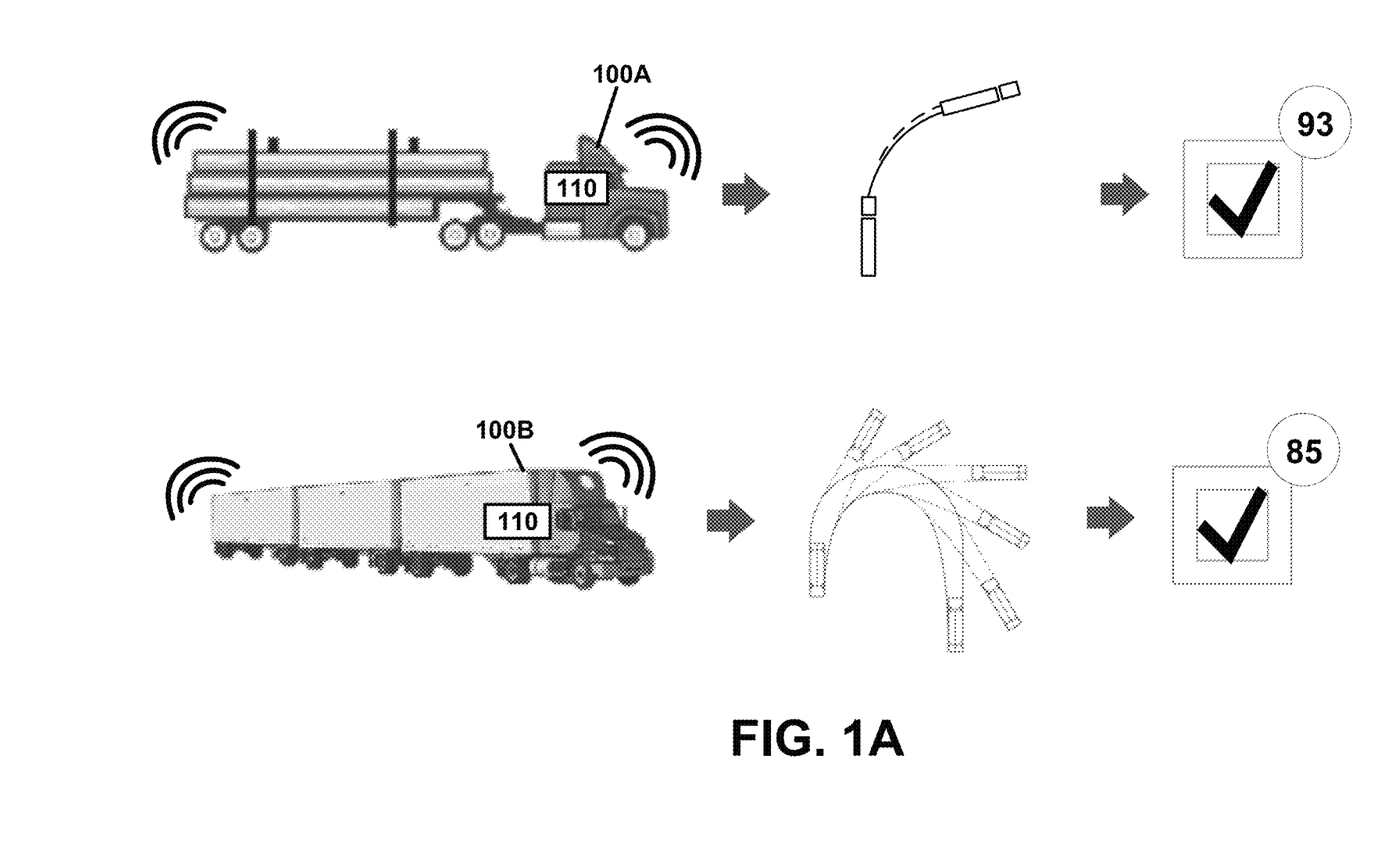
FIG. 1A is a diagram showing an initial trailer health assessment for two autonomous vehicles, according to some embodiments.

FIG. 1A is a diagram showing an initial trailer health assessment for two autonomous vehicles, according to some embodiments. As shown in FIG. 1A, a first autonomous semi-truck 100A, having an onboard trailer health monitor 110, automatically executes a first type of pre-trip maneuver (a soft right turn) and is assigned a passing score of 93. As also shown in FIG. 1A, a second autonomous semi-truck 100B, also having an onboard trailer health monitor 110, automatically executes a second type of pre-trip maneuver (a U-turn) and is assigned a passing score of 85. The first autonomous semi-truck 100A is of a first type (log transport) and the second autonomous semi-truck 100B is of a second type (three-trailer road train). In some implementations, the first type of pre-trip maneuver is assigned to the first autonomous semi-truck 100A and/or the second type of pre-trip maneuver is assigned to the second autonomous semi-truck 100B, based on the associated type of semi-truck. Alternatively or in addition, the first type of pre-trip maneuver can be assigned to the first autonomous semi-truck 100A and/or the second type of pre-trip maneuver can be assigned to the second autonomous semi-truck 100B based on one or more of: a health history of the semi-truck (or of the trailer alone or of the tractor alone), a vehicle age, a current loading (e.g., cargo weight), a current cargo type, a current/planned trip length, a current/planned trip profile, or a current/planned trip terrain type of the associated semi-truck.

Figure 1B:
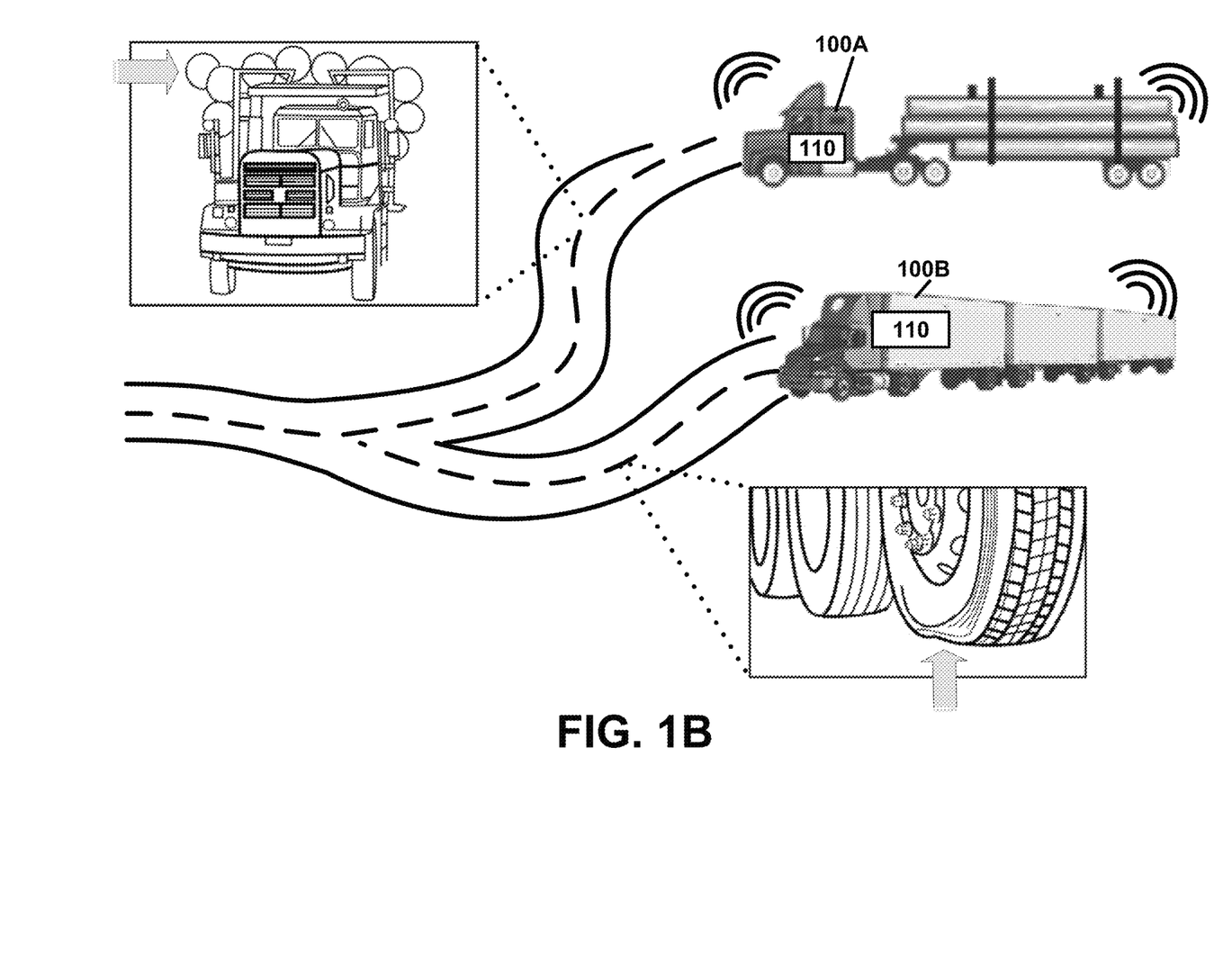
FIG. 1B is a diagram showing real-time trailer health monitoring for the two autonomous vehicles of FIG. 1A.

FIG. 1B is a diagram showing real-time trailer health monitoring for the two autonomous vehicles of FIG. 1A. The real-time trailer health monitoring can be performed using, for example, one or more of: camera data, sensor data, or vehicle dynamics data. As shown in FIG. 1A, the first autonomous semi-truck 100A is travelling along the upper road and the second autonomous semi-truck 100B is travelling along the lower road, the lower road merging with the upper road at a future location relative a current position of the second autonomous semi-truck 100B. As the first autonomous semi-truck 100A travels along the upper road, camera data generated at the first autonomous semi-truck 100A is used to detect an anomaly, the anomaly being that one of the logs of its cargo is loose or out of position (see upper arrow). In response to detecting the anomaly, the first autonomous semi-truck 100A can automatically navigate to a nearest safe parking location and disable itself. Similarly, as the second autonomous semi-truck 100B travels along the lower road, camera data generated at the second autonomous semi-truck 100B is used to detect an anomaly, the anomaly being that one of its tires is underinflated (see lower arrow). In response to detecting the anomaly, the second autonomous semi-truck 100B can automatically navigate to a nearest safe parking location and disable itself. The navigation and disabling of the first autonomous semi-truck 100A, the navigation and disabling of the second autonomous semi-truck 100B, a selection of the nearest safe parking location for the first autonomous semi-truck 100A, and/or the selection of the nearest safe parking location for the second autonomous semi-truck 100B, in addition to being based on the detected one or multiple anomalies, can be based on and/or in response to detecting, at the first autonomous semi-truck 100A, at the second autonomous semi-truck 100B, or at a remote compute device in communication with the autonomous semi-trucks 100A/100B, that the upper and lower roads merge up ahead, posing a collision risk between the first autonomous semi-truck 100A and the second autonomous semi-truck 100B.

Figure 1C:
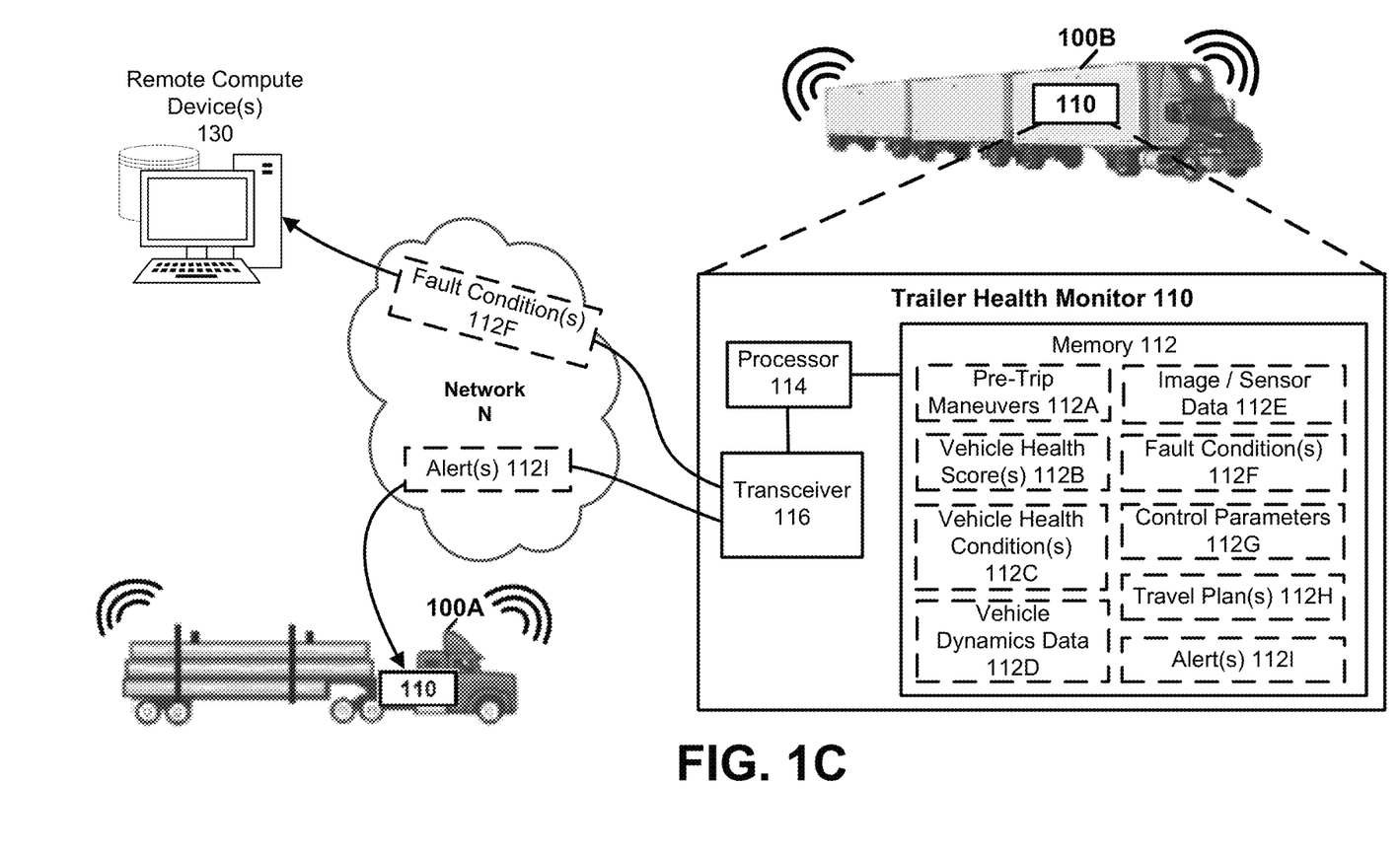
FIG. 1C is a diagram of a trailer health monitor system for an autonomous vehicle, according to some embodiments.

FIG. 1C is a diagram of a trailer health monitor system for an autonomous vehicle, according to some embodiments. As shown in FIG. 1C, the trailer health monitor 110—which can reside in or on autonomous vehicle 100B (and, similarly, can reside in or on autonomous vehicle 100A in FIGS. 1A-1B)—includes a processor 114 operably coupled to a memory 112 and a transceiver 116. The memory 112 stores one or more of: pre-trip maneuvers 112A, vehicle health score(s) 112B, vehicle health condition(s) 112C, vehicle dynamics data 112D, image/sensor data 112E, fault condition(s) 112F, control parameters 112G, travel plan(s) 112H, and alert(s) 112I. Each of the foregoing can be generated by electronics (e.g., sensors) onboard the autonomous vehicle 100B and/or the processor 114. In addition, pre-trip maneuvers 112A, vehicle health score(s) 112B, vehicle health condition(s) 112C can be received at the trailer health monitor 110, via the transceiver 116 and a wireless telecommunications network "N," from one or more remote compute device(s) 130. In addition, the fault condition(s) 112F may be transmitted via the transceiver 116 to the one or more remote compute devices 130 via the network N (e.g., for subsequent querying in connection with autonomous vehicle operations and/or pre-trip maneuvers). Similarly, one or more of the alert(s) 112I may be transmitted via the transceiver 116 to one or more other autonomous vehicles (e.g., autonomous vehicle 100A), for example in response to detecting that the one or more other autonomous vehicles are within a predefined proximity to the autonomous vehicle 100B.

The vehicle health condition(s) 112C can include one or more of (but are not limited to): brake health condition, tire health condition, suspension health condition, engine health condition, transmission health condition, pneumatic system health condition, hydraulic system health condition, or load balancing condition.

The vehicle dynamics data 112D can include one or more of (but are not limited to): linear speed (e.g., lateral speed, optionally with direction (i.e., velocity)), engine torque, engine horsepower, engine displacement volume, weight (e.g., tractor and/or trailer weight), cargo type and attachment method, vehicle surface area, vehicle dimensions, wheel turn angle, turn radius, wheel velocity (e.g., rotational equivalent wheel velocity or wheel ground contact point velocity), longitudinal slip, side (lateral) slip, tire side-slip angle.

The image/sensor data 112E can include one or more of (but are not limited to): video, still image photographs, infrared imagery, lidar data, accelerometer data, magnetometer data, gyroscope data, yaw, pitch, roll, mass airflow sensor data, engine speed sensor data, oxygen sensor data, spark knock sensor data, coolant sensor data, manifold absolute pressure (MAP) sensor data, fuel sensor data, fuel temperature sensor data, voltage sensor data, oil pressure sensor data, oil temperature sensor data, anti-lock braking system (ABS) data, ultrasonic sensor data, internet of things (IoT) sensor data, cargo sensor data, or door sensor data.

The fault condition(s) 112F can include one or more of (but are not limited to): tire leak, tire underinflation, tire overinflation, loose tire, unbalanced load, loose cargo, suspension misalignment, brake insufficiency (e.g., brake fade, brake wear), brake failure, brake fluid leak, U-joint failure, worn suspension, wheel bearing fault, air leak, hydraulic leak, engine fault, or coolant leak.

The control parameters 112G can include one or more of (but are not limited to): engine torque, engine speed, linear speed, angular speed, turning radius, turning speed, brake pedal status, brake pressure, rate of acceleration, rate of deceleration, steering position, steering angle, throttle value, and route selection.

Figure 2:
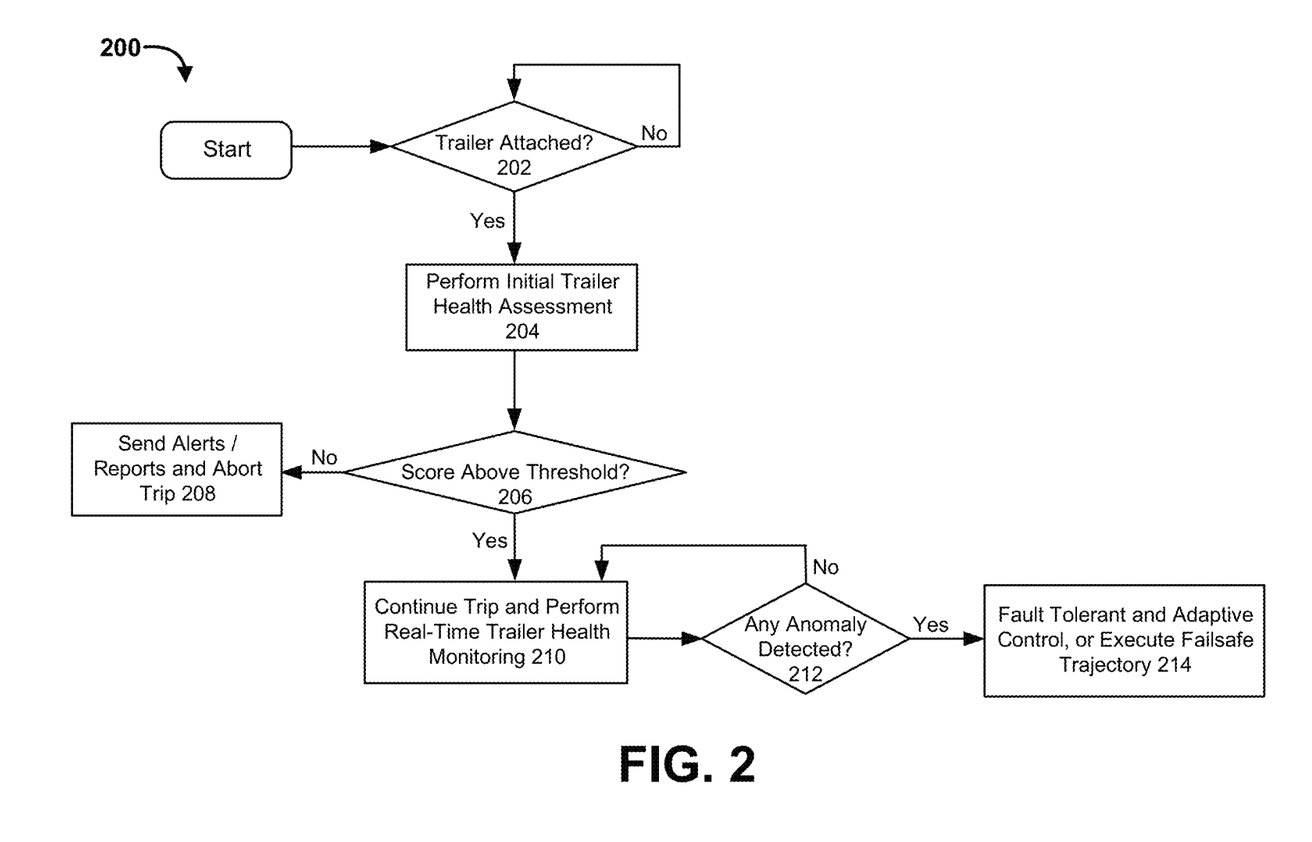
FIG. 2 is a flow diagram of a method including an initial trailer health assessment and real-time trailer health monitoring, according to some embodiments.

FIG. 2 is a flow diagram of a method including an initial trailer health assessment and real-time trailer health monitoring, according to some embodiments. The method 200 of FIG. 2 can be implemented, for example, using the trailer health monitor 110 of FIG. 1C. As shown in FIG. 2, the method 200 begins with detecting, at 202, whether a trailer is attached to an autonomous tractor (e.g., based on image and/or sensor data, such as 112E of FIG. 1C). If a trailer is not detected at 202, the method 200 can loop back to iterative checks until a trailer is detected. If a trailer is detected at 202, an initial trailer health assessment is performed at 204, and a trailer health score (e.g., vehicle health score(s) 112B of FIG. 1C) is calculated. At 206, a determination is made as to whether the trailer health score is above a predefined threshold. If the trailer health score is not above the predefined threshold at 206, one or more alerts and/or reports (e.g., alert(s) 112I of FIG. 1C) may be sent, at 208, and a trip associated with the autonomous vehicle is aborted. Note that although shown at 208 to include aborting the trip, alternatively or in addition to aborting the trip in response to the score not being above the predefined threshold, one or more of the following may performed: a repair for the autonomous vehicle can be scheduled, one or more modified trips (e.g., shorter trips, trips with less change in elevation, etc.) can be selected and scheduled for the autonomous vehicle (e.g., for immediate or later execution), and the trip may be temporarily delayed.

If the trailer health score is above the predefined threshold at 206, the autonomous vehicle is permitted to continue with its trip (e.g., according to one or more travel plans, such as travel plan(s) 112H of FIG. 112H), at 210, and real-time (or substantially real-time) trailer health monitoring is performed during the trip. During the trip, a determination is made as to whether any anomaly has been detected, at 212 (e.g., based on image data, sensor data, and/or vehicle dynamics data, such as image/sensor data 112E and vehicle dynamics data 112D of FIG. 1C). If no anomaly has been detected at 212, the method 200 can loop back to the monitoring step 210 (which, in parallel, may not have terminated). If an anomaly has been detected at 212, the method 200 proceeds at 214 according to an applicable operating level from a plurality of operating levels of an adaptive control system (e.g., as discussed above). The plurality of operating levels can include, for example, a fault-tolerant mode, an adaptive control mode, and a failsafe mode. When the failsafe mode is applicable at 214, the autonomous vehicle may automatically implement/execute a failsafe trajectory (i.e., safely navigate to a safe location and disable the autonomous vehicle).

Figure 3:
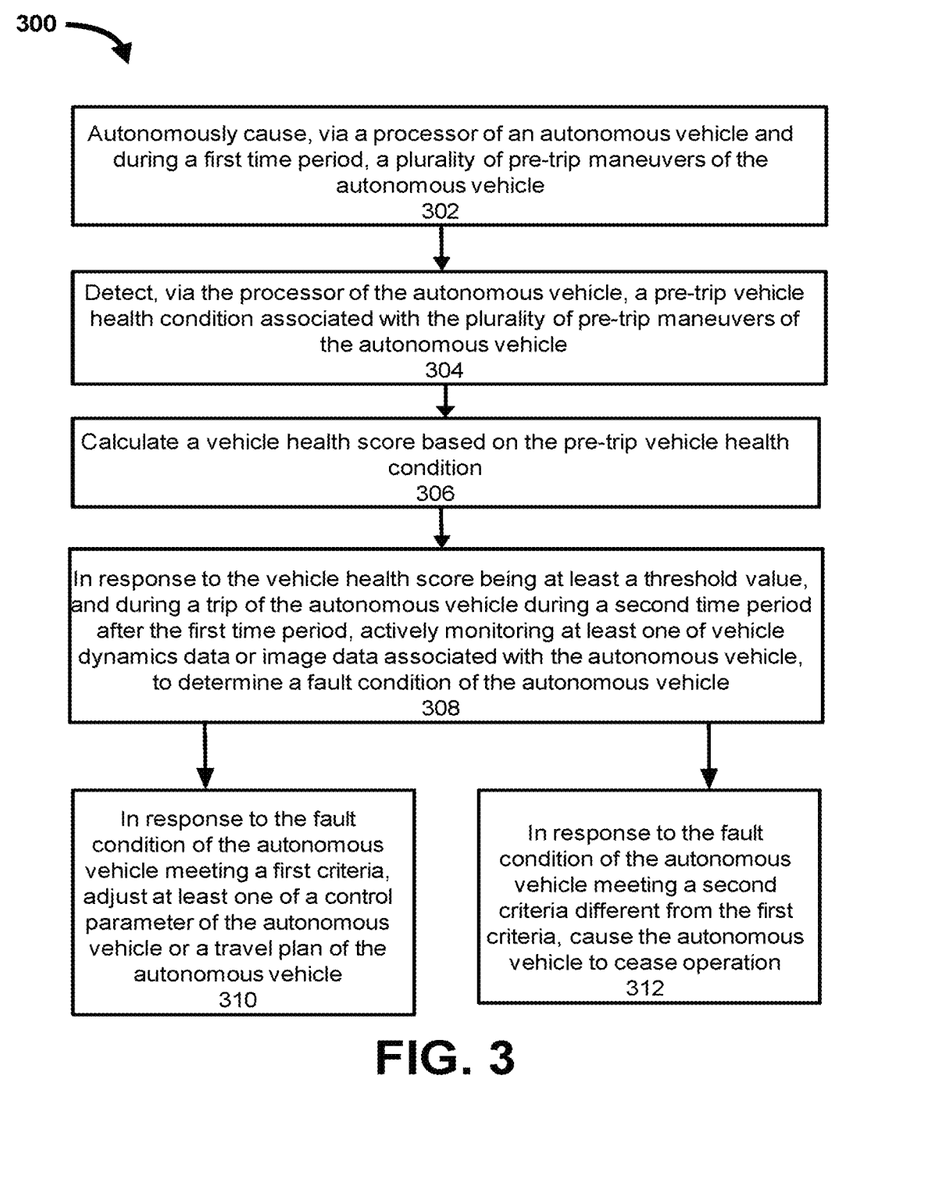
FIG. 3 is a flow diagram showing a first method for assessing and monitoring health conditions of an autonomous vehicle such as a semi-truck, according to some embodiments.

FIG. 3 is a flow diagram showing a first method for assessing and monitoring health conditions of an autonomous vehicle such as a semi-truck, according to some embodiments. As shown in FIG. 3, the method 300 includes performing an initial trailer health assessment and real-time trailer health monitoring. The initial trailer health assessment includes autonomously causing, at 302, via a processor of an autonomous vehicle and during a first time period, a plurality of pre-trip maneuvers of the autonomous vehicle, and detecting, at 304 and via the processor of the autonomous vehicle, a pre-trip vehicle health condition during and/or in response to the plurality of pre-trip maneuvers of the autonomous vehicle. A vehicle health score can be calculated at 306 based on the pre-trip vehicle health condition. In response to the vehicle health score being at least a threshold value, the real-time trailer health monitoring can be performed. The real-time trailer health monitoring includes, during a trip of the autonomous vehicle during a second time period after the first time period, actively monitoring at least one of vehicle dynamics data or image data associated with the autonomous vehicle, at 308, to determine a fault condition of the autonomous vehicle. In response to the fault condition of the autonomous vehicle meeting a first criteria (e.g., as defined in a lookup table), at 310, at least one of a control parameter of the autonomous vehicle or a travel plan of the autonomous vehicle may be adjusted. Alternatively or in addition, in response to the fault condition of the autonomous vehicle meeting a second criteria (e.g., as defined in the lookup table) different from the first criteria, at 312, a signal may be sent to cause the autonomous vehicle to cease movement.

In some implementations, the autonomous vehicle includes a tractor and a trailer. The at least one of the vehicle dynamics data or the image data can be associated with the trailer and not the tractor.

In some implementations, the pre-trip vehicle health condition includes one of a brake system hysteresis, a brake pressure offset, a loading condition, or a wheel balance condition.

In some implementations, the plurality of pre-trip maneuvers of the autonomous vehicle includes one of: brake cycling without moving the autonomous vehicle, gradually increasing brake pressure while moving the autonomous vehicle, or turning the autonomous vehicle at low speed and with a large turn radius.

In some implementations, the fault condition of the autonomous vehicle includes one or more of: wheel misalignment, brake wear, brake fade, or tire underinflation.

The image data associated with the autonomous vehicle includes at least one of image data from a camera of the autonomous vehicle or sensor data received from a sensor (e.g., a lidar sensor) of the autonomous vehicle.

In some implementations, the monitoring the at least one of vehicle dynamics data or image data can be based on one or more additional sensors, such as any combination of any of the following non-limiting list of sensors: lidar sensors, 3-D lidar cameras, radar sensors, infrared cameras, thermal imaging sensors, complimentary metal-oxide-semiconductor (CMOS) sensors, mass airflow sensors, engine speed sensors, oxygen sensors, spark knock sensors, coolant sensors, manifold absolute pressure (MAF) sensors, fuel sensors, fuel temperature sensors, voltage sensors, camshaft position sensors, throttle positions sensors, accelerometers, oil pressure sensors, oil temperature sensors, anti-lock braking systems (ABSs), ultrasonic sensors, internet of things (IoT) sensors, cargo sensors, door sensors, and vehicle speed sensors.

Figure 4:
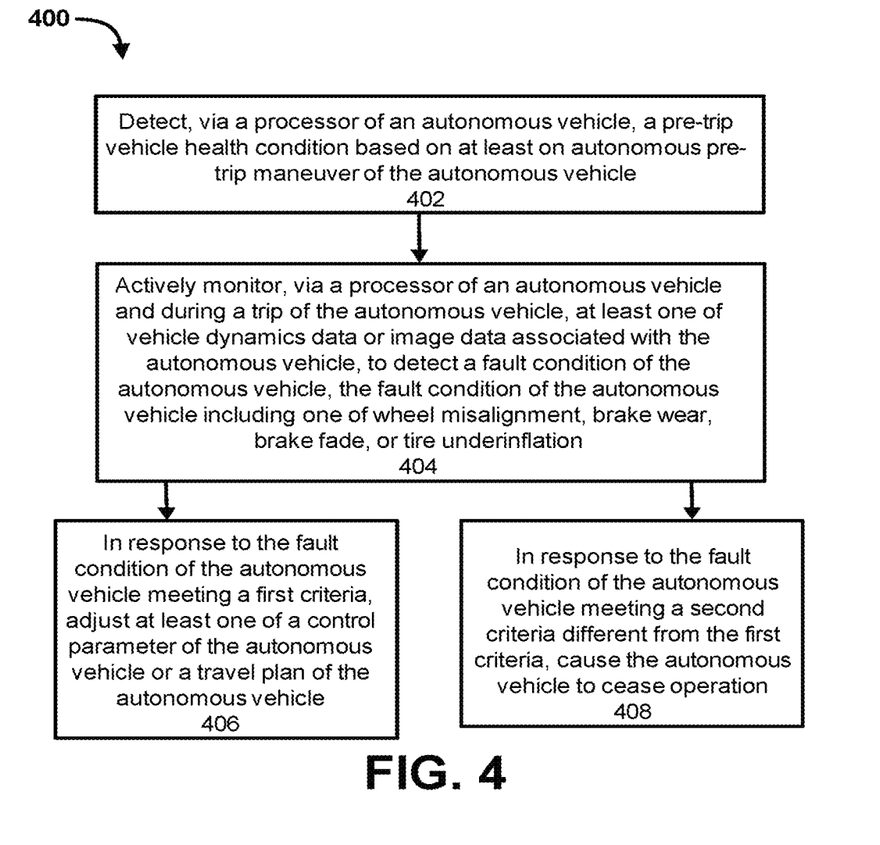
FIG. 4 is a flow diagram showing a second method for assessing and monitoring health conditions of an autonomous vehicle such as a semi-truck, according to some embodiments.

FIG. 4 is a flow diagram showing a second method for assessing and monitoring health conditions of an autonomous vehicle such as a semi-truck, according to some embodiments. As shown in FIG. 4, the method 400 includes detecting, at 402 and via a processor of an autonomous vehicle, a pre-trip vehicle health condition based on at least on autonomous pre-trip maneuver of the autonomous vehicle. The method 400 also includes actively monitoring, at 404, via a processor of an autonomous vehicle and during a trip of the autonomous vehicle, at least one of vehicle dynamics data or image data associated with the autonomous vehicle, to detect a fault condition of the autonomous vehicle. The fault condition of the autonomous vehicle including, for example, one or more of: wheel misalignment, brake wear, brake fade, or tire underinflation. The method 400 also includes at least one of: (1) in response to the fault condition of the autonomous vehicle meeting a first criteria, adjusting at least one of a control parameter of the autonomous vehicle or a travel plan of the autonomous vehicle at 406; or (2) in response to the fault condition of the autonomous vehicle meeting a second criteria different from the first criteria, causing the autonomous vehicle to cease operation at 408. Ceasing operation can refer to ceasing movement and/or interrupting the supply of power to one or more subsystems of the autonomous vehicle.

In some implementations, the method 400 also includes, in response to the fault condition of the autonomous vehicle meeting the second criteria, generating an anomaly report and causing at least one of display, storage, or transmission of the anomaly report.

In some implementations, the autonomous vehicle includes a tractor and a trailer. At least one of the vehicle dynamics data, the image data, or the fault condition may be associated with the trailer and not the tractor.

The image data associated with the autonomous vehicle includes at least one of image data from a camera of the autonomous vehicle or sensor data received from a sensor (e.g., a lidar sensor) of the autonomous vehicle.

In some implementations, the monitoring the at least one of vehicle dynamics data or image data associated with the autonomous vehicle can be based on one or more additional sensors, such as any combination of any of the following non-limiting list of sensors: lidar sensors, 3-D lidar cameras, radar sensors, infrared cameras, thermal imaging sensors, complimentary metal-oxide-semiconductor (CMOS) sensors, mass airflow sensors, engine speed sensors, oxygen sensors, spark knock sensors, coolant sensors, manifold absolute pressure (MAF) sensors, fuel sensors, fuel temperature sensors, voltage sensors, camshaft position sensors, throttle positions sensors, accelerometers, oil pressure sensors, oil temperature sensors, anti-lock braking systems (ABSs), ultrasonic sensors, internet of things (IoT) sensors, cargo sensors, door sensors, and vehicle speed sensors.

In some implementations, the detection of the fault condition of the autonomous vehicle is based on at least one of a brake system hysteresis, a brake pressure offset, a loading condition, or a wheel balance condition.

Figure 5:
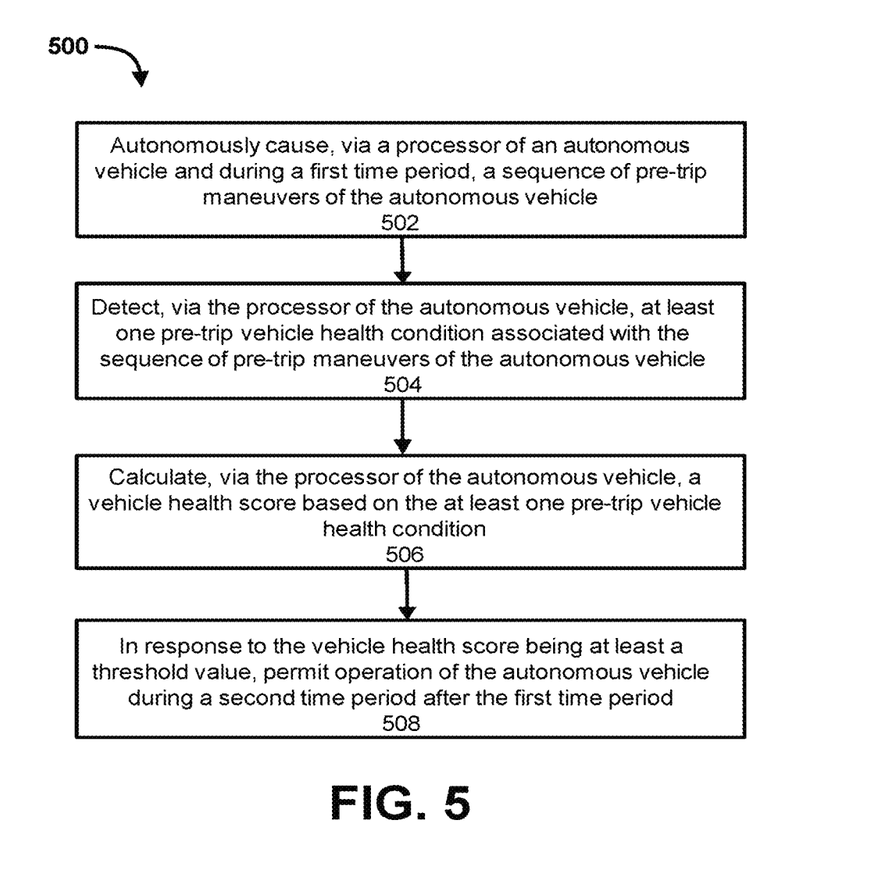
FIG. 5 is a flow diagram showing a third method for assessing and monitoring health conditions of an autonomous vehicle such as a semi-truck, according to some embodiments.

In some embodiments, a non-transitory, processor-readable medium stores processor-executable instructions that, when executed by a processor, cause the processor to perform a method as shown in FIG. 5. FIG. 5 is a flow diagram showing a third method for assessing and monitoring health conditions of an autonomous vehicle such as a semi-truck, according to some embodiments. As shown in FIG. 5, the method 500 includes autonomously causing, at 502 and via the autonomous vehicle, a sequence of pre-trip maneuvers of the autonomous vehicle to be performed during a first time period. The method 500 also includes detecting, at 504 and via the autonomous vehicle, at least one pre-trip vehicle health condition during and/or in response to the sequence of pre-trip maneuvers of the autonomous vehicle, and to calculate, at 506 and via the autonomous vehicle, a vehicle health score based on the at least one pre-trip vehicle health condition. The method 500 also includes permitting operation of the autonomous vehicle during a second time period after the first time period, at 508, in response to the vehicle health score being at least a threshold value.

In some implementations, the autonomous vehicle includes a tractor and a trailer. The at least one pre-trip vehicle health condition may be associated with the trailer and not the tractor.

In some implementations, the sequence of pre-trip maneuvers of the autonomous vehicle includes at least one of: brake cycling without moving the autonomous vehicle, gradually increasing brake pressure while moving the autonomous vehicle, or turning the autonomous vehicle at low speed and with a large turn radius.

In some implementations, the pre-trip vehicle health condition specifies at least one of a brake system condition, a loading condition, or a balance condition.

In some implementations, the method 500 also includes detecting at least one of wheel misalignment of the autonomous vehicle, brake wear of the autonomous vehicle, brake fade of the autonomous vehicle, or tire underinflation of the autonomous vehicle based on the at least one pre-trip vehicle health condition.

In some implementations, the method 500 includes modifying an operational setting in response to the vehicle health score being lower than the threshold value. For example, modifying the operational setting can include, but is not limited to, one or more of: scheduling a maintenance check, scheduling a repair, scheduling a tune-up, modifying one or more planned trips associated with the autonomous vehicle (e.g., replacing a route of the one or more planned trips with a replacement route having a shorter distance, fewer changes in elevation, and/or less overall change in elevation), cancelling one or more planned trips associated with the autonomous vehicle, or reducing a speed of the autonomous vehicle.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
monitoring, by a computing system, whether a trailer is attached to a vehicle;
based on an initial health assessment associated with the trailer, permitting, by the computing system, the vehicle to proceed on a trip, the initial health assessment associated with execution of a type of pre-trip maneuver that is assigned to the vehicle based on at least one of a health history of the vehicle, a cargo weight, a cargo type, a trip length, and a trip terrain type;
detecting, by the computing system, an anomaly associated with the trailer during the trip; and
in response to the anomaly, selecting, by the computing system, an operating level of a plurality of operating levels associated with an adaptive control system of the vehicle.

2. The computer-implemented method of claim 1, wherein the plurality of operating levels are associated with a predetermined number of operating levels associated with the adaptive control system of the vehicle when the vehicle is running.

3. The computer-implemented method of claim 1, wherein the operating level is a fault tolerant operating level of the plurality of operating levels associated with a first range of deviations.

4. The computer-implemented method of claim 3, wherein no action is taken in response to the anomaly in the fault tolerant operating level.

5. The computer-implemented method of claim 3, wherein the operating level is an adaptive monitoring and control operating level of the plurality of operating levels associated with a second range of deviations associated with higher severity than the first range of deviations.

6. The computer-implemented method of claim 5, wherein an adjustment is made to a control parameter or a travel plan of the vehicle in response to the anomaly in the adaptive monitoring and control operating level.

7. The computer-implemented method of claim 6, wherein the anomaly is associated with at least one of relatively larger tire resistance and relatively smaller effective tire radius.

8. The computer-implemented method of claim 1, wherein the operating level is a failsafe operating level of the plurality of operating levels.

9. The computer-implemented method of claim 8, wherein the vehicle is stopped in response to the anomaly in the failsafe operating level.

10. The computer-implemented method of claim 9, wherein the anomaly is associated with insufficient braking.

11. The computer-implemented method of claim 1, wherein the anomaly is associated with a sensor fault associated with steering of the tractor and the anomaly is also detectable during the initial health assessment.

12. A system comprising:
at least one processor; and
a memory storing instructions that, when executed by the at least one processor, cause the system to perform operations comprising:
monitoring whether a trailer is attached to a vehicle;
based on an initial health assessment associated with the trailer, permitting the vehicle to proceed on a trip, the initial health assessment associated with execution of a type of pre-trip maneuver that is assigned to the vehicle based on at least one of a health history of the vehicle, a cargo weight, a cargo type, a trip length, a trip terrain type;
detecting an anomaly associated with the trailer during the trip; and
in response to the anomaly, selecting an operating level of a plurality of operating levels associated with an adaptive control system of the vehicle.

13. The system of claim 12, wherein the plurality of operating levels are associated with a predetermined number of operating levels associated with the adaptive control system of the vehicle when the vehicle is running.

14. The system of claim 12, wherein the operating level is a fault tolerant operating level of the plurality of operating levels associated with a first range of deviations.

15. The system of claim 14, wherein no action is taken in response to the anomaly in the fault tolerant operating level.

16. The system of claim 14, wherein the operating level is an adaptive monitoring and control operating level of the plurality of operating levels associated with a second range of deviations associated with higher severity than the first range of deviations.

17. A non-transitory computer-readable storage medium including instructions that, when executed by at least one processor of a computing system, cause the computing system to perform operations comprising:

monitoring whether a trailer is attached to a vehicle;

based on an initial health assessment associated with the trailer, permitting the vehicle to proceed on a trip, the initial health assessment associated with execution of a type of pre-trip maneuver that is assigned to the vehicle based on at least one of a health history of the vehicle, a cargo weight, a cargo type, a trip length, and a trip terrain type;

detecting an anomaly associated with the trailer during the trip; and in response to the anomaly, selecting an operating level of a plurality of operating levels associated with an adaptive control system of the vehicle.

18. The non-transitory computer-readable storage medium of claim 17, wherein the plurality of operating levels are associated with a predetermined number of operating levels associated with the adaptive control system of the vehicle when the vehicle is running.

19. The non-transitory computer-readable storage medium of claim 17, wherein the operating level is a fault tolerant operating level of the plurality of operating levels associated with a first range of deviations.

20. The non-transitory computer-readable storage medium of claim 19, wherein no action is taken in response to the anomaly in the fault tolerant operating level.

* * * * *